United States Patent Office 3,373,475
Patented Mar. 19, 1968

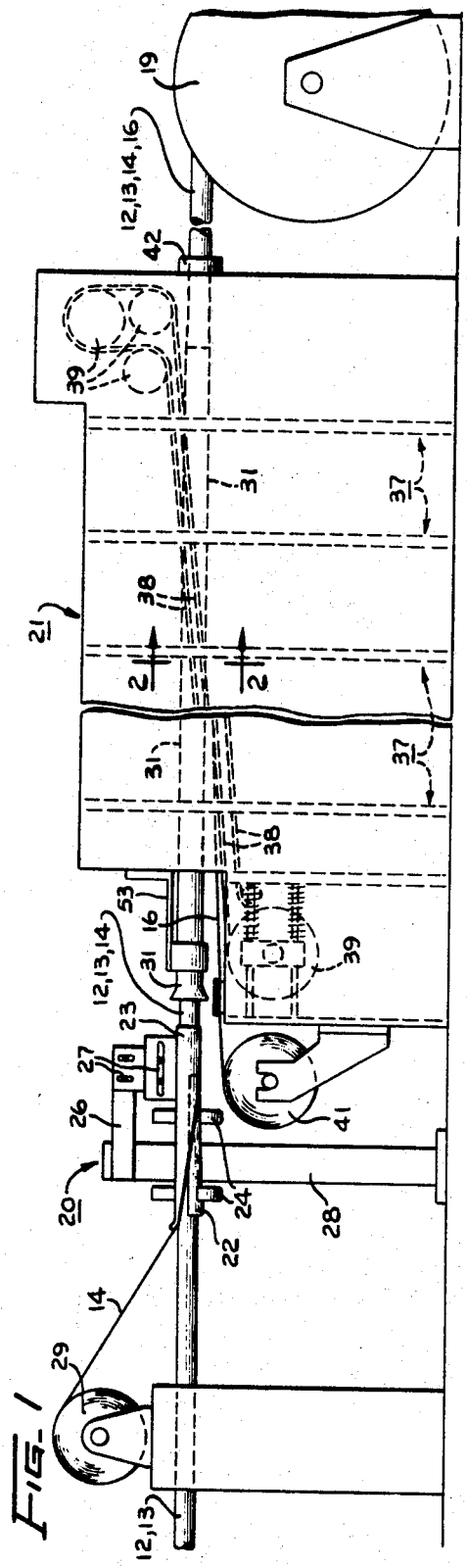

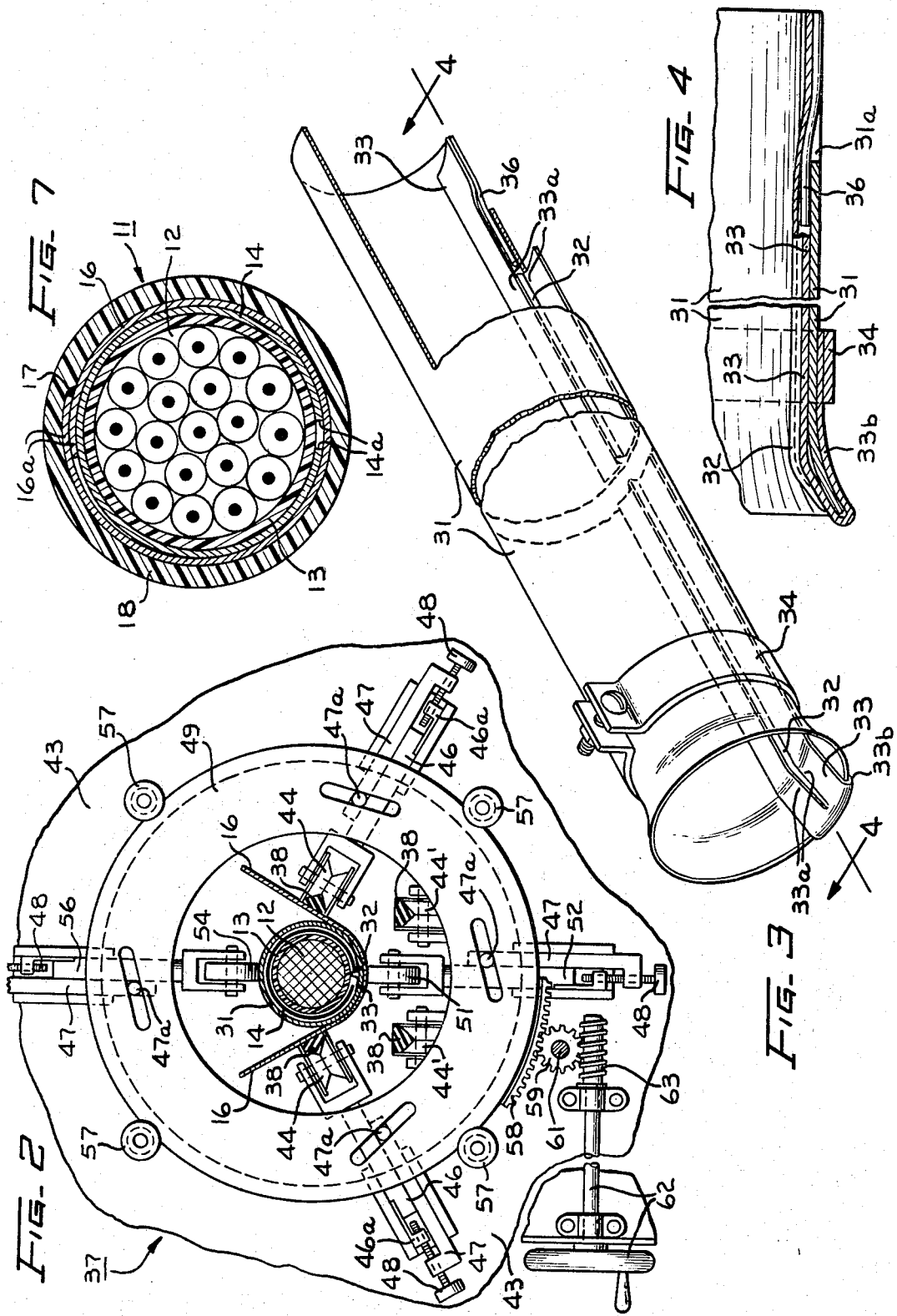

---

3,373,475
APPARATUS FOR FOLDING TAPE ABOUT A STRAND
Warren E. Petersen, Council Bluffs, Iowa, assignor to Western Electric Company Incorporated, New York, N.Y., a corporation of New York
Filed Mar. 7, 1966, Ser. No. 532,395
6 Claims. (Cl. 29—202.5)

This invention relates to apparatus for folding tape about a strand, and more particularly to apparatus for folding an elongated tape about a longitudinally advancing strand so that the tape extends longitudinally of the strand with edges of the tape in closely adjacent preselected positions.

In the manufacture of certain communication cable, it is standard practice to fold an aluminum tape about a longitudinally advancing, jacketed cable core so that the tape extends longitudinally of the jacketed cable core with edges of the tape in closely adjacent, opposed relationship, to form a shield for protecting the jacketed cable core against heat damage during a subsequent soldering operation, and against damage by lightning when the cable is installed in the field. The advancing jacketed cable core and aluminum tape then pass through a forming tube, and a steel tape is folded about the forming tube adjacent an exit end thereof so that the steel tape also extends longitudinally of the strand and so that as the jacketed cable core and the aluminum tape exit from the forming tube they are enveloped by the steel tape. Subsequently, overlapped edge portions of the steel tape are soldered together at a soldering station to form a continuous seam, thereby producing an enclosed casing for protecting the jacketed cable core from external physical damage.

Since the heat generated by the soldering operation tends to travel a considerable distance from the soldered seam, by conduction through the steel tape and by radiation, it is necessary that the opposed edges of the aluminum tape be maintained as nearly as possible on the side of the jacketed cable core opposite from the side on which the soldering operation takes place. Otherwise, the heat passing through the gap between the unsealed edges of the aluminum tape may be sufficient to cause damage to the jacket of the cable core, and even to the core itself. Further, unless the edges of the aluminum tape are maintained displaced from adjacent the overlapped edge portions of the steel tape, an edge portion of the aluminum tape may work between the overlapped edge portions of the steel tape such that the edge portions are not joined together by the soldering operation, thereby resulting in a defective seam.

In the latter situation, the seam is repaired, or the cable may have to be subjected to a reprocessing operation in which the aluminum and steel tapes are stripped from the jacketed cable core and new aluminum and steel tapes are applied thereto. If the jacket of the cable core has suffered heat damage it also may be necessary to strip the jacket from the cable core and extrude a new jacket thereon. Further, if the cable core has suffered heat damage, or in the case of relatively small cables in which the jacket cannot be removed without permanently damaging the cable core, it may be necessary to scrap the cable entirely.

Heretofore, in order that the opposite edges of the aluminum tape be on the opposite side of the jacketed cable core from the overlapped edge portions of the steel tape to be soldered, the alumnium tape has been folded about the jacketed cable core so that the opposed edges of the tape are on the bottom thereof, while the steel tape has been folded about the forming tube so that the over-lapped edge portions of the steel tape are on top of the jacketed cable core. This procedure has proven to be unsatisfactory because of a tendency of the aluminum tape to rotate in random fashion about the jacketed cable core as the jacketed cable core and the aluminum tape are advanced through the forming tube, such that by the time the aluminum tape reaches the steel tape soldering station the edges of the aluminum tape frequently are adjacent the overlapped edge portions of the steel tape, resulting in defective conditions in the completed cable as above described. This condition is further aggravated as cable line speed is increased, thereby imposing a limitation on the maximum line speed which can be utilized in manufacturing operations.

Accordingly, an object of this invention is to provide new and improved apparatus for folding an elongated tape about a longitudinally advancing strand so that the tape extends longitudinally of the strand with edges of the tape in closely adjacent preselected positions.

A further object of this invention is to provide new and improved apparatus for folding an elongated tape about a longitudinally advancing strand so that the tape extends longitudinally of the strand with edges of the tape in closely adjacent preselected positions, in which the strand can be advanced at a substantially faster rate than in prior known apparatus.

A still further object of this invention is to provide new and improved apparatus for folding first and second elongated tapes about a longitudinally advancing strand so that the tapes extend longitudinally of the strand with edges of each tape closely adjacent one another and in preselected positions relative to the edges of the other tape.

Another object of this invention is to provide new and improved apparatus for manufacturing communication cable of the type which is enclosed in a protective metal casing, in which the amount of cable which must be reprocessed or scrapped, is substantially reduced.

In accordance with the invention, an elongated tape is folded about a longitudinally advancing strand so that the tape extends longitudinally of the strand with the edges of the tape in opposed relationship. The strand and the folded tape then pass through an elongated tube provided with a longitudinally extending internal bead which defines preselected positions of the opposed edges of the tape. If the tape enters the tube with its opposed edges displaced from their preselected positions, the bead engages the tape and exerts pressure thereon so as to cause rotation of the tape about the strand until the opposed edges of the tape are in their preselected positions adjacent opposite sides of the bead, after which the bead engages the opposed edges of the tape to prevent further rotation of the tape about the strand.

In a preferred embodiment of the invention, apparatus for folding first and second elongated tapes about a longitudinally advancing strand, such as a communication cable, includes a first folding mechanism for folding the first tape about the strand so that the tape extends longitudinally of the strand with edges of the tape in opposed relationship. The strand and the folded first tape then pass through an elongated tube provided with a longitudinally extending internal bead which defines preselected positions of the opposed edges of the tape, the bead and surface portions in the tube adjacent the bead being relatively smooth so as not to damage the strand and the tape as they advance through the tube. If the first tape enters the tube with its opposed edges displaced from their preselected positions, the bead engages the tape and exerts pressure thereon so as to cause rotation of the tape about the strand until the opposed edges of the tape are in their preselected positions adjacent opposite sides of the bead, after which the bead engages the opposed edges of the tape to prevent further rotation of the tape about the strand. A second folding mechanism folds the second elongated tape about the elongated tube adjacent an exit end of the tube such that the second tape also extends longitudinally of the strand, with edges of the tape in preselected positions relative to the preselected postions of the opposed edges of the first tape, and such that the strand and the first tape are enveloped by the second tape as the strand and the first tape exit from the tube.

This invention, together with further objects and advantages thereof, will best be understood by reference to the following detailed description, taken in connection with the accompanying drawings, in which:

FIG. 1 is an elevational view of apparatus in accordance with the invention;

FIG. 2 is an enlarged cross-sectional view of the apparatus shown in FIG. 1, taken substantially along the line 2—2 of FIG. 1;

FIG. 3 is an isometric view, partially in cross section, of a part of the apparatus;

FIG. 4 is a partial, cross-sectional view of the part of the apparatus shown in FIG. 3, taken along the line 4—4;

FIG. 5 is an enlarged cross-sectional view of the part of the apparatus shown in FIG. 3, illustrating an undesirable manufacturing condition which the apparatus is designed to correct;

FIG. 6 is a cross-sectional view similar to FIG. 5, after the undesirable manufacturing condition has been corrected; and FIG. 7 is a cross-sectional view of a metal shielded communication cable.

Referring to FIG. 7, it is seen that the illustrated embodiment of the invention relates to the manufacture of a communication cable 11 which includes a cable core 12 in the form of a plurality of insulated electrical conductors enclosed in an extruded plastic jacket 13. The jacket 13 is wrapped in an elongated aluminum tape 14 having edges 14a thereof in closely adjacent relationship, and the jacket and the aluminum tape are enclosed in a casing formed by an elongated steel tape 16 having a continuous soldered seam 17. The aluminum tape 14 forms a shield for protecting the cable core 12 and its jacket 13 against heat damage during the soldering of the steel tape seam 17, and against damage from lightning when the cable 11 is installed in the field, while the steel tape 16 protects the cable core and its jacket from external physical damage. The soldered steel tape 16 is further enclosed in an outer extruded plastic jacket 18.

Referring to FIG. 1, it is seen that the jacketed cable core 12, 13 is advanced from left to right, as viewed in this figure, from a supply reel (not shown) by a takeup mechanism 19. Initially, the jacketed cable core 12, 13 passes through a folding tool 20 which folds the aluminum tape 14 about the jacket 13 of the cable core 12 so that the tape extends longitudinally thereof with the edges 14a (FIG. 7) of the tape in closely adjacent opposed relationship therebeneath. The jacketed cable core 12, 13 and the folded aluminum tape 14 then pass through folding apparatus 21 for folding the steel tape 16 about the jacketed cable core and the folded aluminum tape so that the steel tape extends longitudinally of the jacketed cable core with edge portions 16a (FIG. 7) of the steel tape in overlapped relationship on the top of the jacketed cable core. Subsequently, the jacketed cable core 12, 13 and the two folded tapes 14 and 16 pass through a soldering device (not shown) which solders the overlapped edge portions 16a of the steel tape 16 to form the continuous soldered seam 17.

The folding tool 20 may be of any suitable type, and in the illustrated embodiment of the invention includes an upwardly facing, semi-circular support member 22 for the jacketed cable core 12, 13, and a tape folding member 23, the cross-section of which progressively varies from a substantially flat configuration to a circular configuration, from left to right, as viewed in FIG. 1. The cross-sectional dimensions of the support member 22 and the folding member 23 are dependent on the size of the cable 11 being processed. The support member 22 is removably secured to the tape folding member 23 by suitable C-shaped brackets 24 fixedly mounted on the folding member, and the folding member is adjustably mounted on an outer end of a cantilevered arm 26 for vertical and horizontal movement by means of suitable bolt and slot connections 27, as shown in FIG. 1. The other end of the cantilevered arm 26 is secured to a vertical mounting post 28.

As the jacketed cable core 12, 13 passes through the aluminum tape folding tool 20, the aluminum tape 14 is pulled in the form of a flat sheet from a supply roll 29 through the tape folding member 23, which gradually folds the tape into a circular configuration about the jacketed cable core, in a manner well known to those skilled in the art, so that the edges 14a (FIG. 7) of the tape are in closely adjacent opposed relationship substantially beneath the jacketed cable core. Then, as the jacketed cable core 12, 13 and the folded aluminum tape 14 exit from the aluminum tape folding tool 20 to the steel tape folding apparatus 21, the jacketed cable core is substantially enveloped by the aluminum tape.

From the aluminum tape folding tool 20 the jacketed cable core 12, 13 and the folded aluminum tape 14 enter and pass through an elongated forming tube 31 of the steel tape folding apparatus 21, during which travel the folded aluminum tape has a tendency to rotate in random fashion about the jacketed cable core. When this rotation of the aluminum tape 14 is uncontrolled, as in prior known apparatus, the tape frequently rotates into a position in which its edges 14a (FIG. 7) are adjacent the top of the jacketed cable core 12, 13 when the overlapped edge portions 16a of the steel tape 16 are soldered together, whereby the heat through the gap between the unsealed edges of the aluminum tape during the soldering operation is sufficient to damage the plastic jacket 13 of the cable core, and even the insulation on the conductors of the cable core. Further, one of the edges 14a of the aluminum tape 14 may work between the overlapped edge portions 16a of the steel tape 16 so that the edge portions are not properly soldered together during the soldering operation, thereby resulting in a defect in the seam 17.

Thus, as is best shown in FIG. 3, in accordance with this invention the forming tube 31 of the steel tape folding apparatus 21 is provided with an internal tape orienting and guiding bead 32 which extends the length of the forming tube along its bottom. Further, the aluminum tape folding tool 20, which supports the jacketed cable core 12, 13 and the folded aluminum tape 14 adjacent the entrance end of the forming tube 31, and the steel tape folding apparatus 21, which supports the forming tube adjacent its exit end in a manner to be described, are preset vertically such that as the jacketed cable core and the folded aluminum tape are advanced through the forming tube they ride on the bead with the bead exerting radially inward pressure on the jacketed cable core.

In this regard, it has been found that with this arrangement, if the jacketed cable core 12, 13 and the folded aluminum tape 14 enter the forming tube 31 with the tape rotated such that the gap between its edges 14a is not at the bottom of the jacketed cable core, as illustrated in FIG. 5, the exertion of pressure on the tape by the bead 32 causes the tape to rotate about the jacketed cable core as it and the tape are being advanced, until the opposed edges of the tape are on opposite sides of the bead, as illustrated in FIG. 6. While the reasons for the bead 32 functioning in this manner are not completely understood, it is believed to be attributable to the bead producing a frictional drag on the aluminum tape 14, which drag, in combination with the longitudinal tension being produced in the tape 14 as a result of its advancement, creates stresses in the tape which overcome any other stresses thereon to cause the tape to rotate into the position in FIG. 6 in which its edges 14a are on opposite sides of the bead. Thereafter, as long as the jacketed cable core 12, 13 remains in engagement with the bead 32, the bead acts as a guide to retain the edges 14a of the tape 14 in their proper positions beneath the jacketed cable core.

In this connection, the jacketed cable core 12, 13 and the folded aluminum tape 14, having once been brought into engagement with the bead 32, as shown in FIG. 6, normally will remain so engaged as a result of the weight of the jacketed cable core. However, if for some reason the jacketed cable core 12, 13 and the oriented tape 14 lift out of engagement with the bead 32 (as for example as a result of a variation in the advancing tension in the jacketed cable core) and the tape rotates out of its oriented position, upon return of the jacketed cable core and the tape to the bottom of the forming tube 31 so that the tape again is in pressure engagement with the bead, the bead will automatically restore the tape to its oriented position. In this regard, it has been found that the gap between the opposed edges 14a of the aluminum tape 14 will be in proper position beneath the jacketed cable core 12, 13 when the jacketed cable core and the aluminum tape reach the steel tape soldering station, even with an increase in cable line speed on the order of two to three times the line speed which could be attained with prior known apparatus without producing a substantial amount of the cable 11 in which the jacket 13 of the cable core 12 and the insulation of the conductors of the cable core had suffered heat damage, or in which there were defects in the seam 17 of the steel tape 16, as described hereinabove.

The bead 32 and surface portions in the forming tube 31 adjacent the bead must be relatively smooth so as not to cause damage to the aluminum tape 14, such as by tearing the edges 14a of the aluminum tape as it passes through the forming tube in oriented position with the edges engaged with the sides of the bead, or to cause damage to the cable core jacket 13. In the illustrated embodiment of the invention, this is achieved by forming the bead 32 in a prefabricated insert 33 and forming the insert to conform to the curved interior surface of the forming tube 31, in a pressing operation. The prefabricated insert 33, which is in the form of an elongated metal strip having a relatively smooth top surface, whereby the bead 32 formed therein and surface portions 33a thereof adjacent the bead are relatively smooth, then is mounted in the forming tube 31 along its bottom.

More specifically, as is shown in FIGS. 3 and 4, the prefabricated insert 33 is fixed to the forming tube 31 at the tube's entrance end by an extension 33b of the insert, which is bent underneath the tube and secured thereto by a suitable circular clamp 34. At the exit end of the forming tube 31 the prefabricated insert 33 has a length of wire 36 soldered or otherwise secured to its underside in the bead 32, and the wire is swaged into a slot 31a in the bottom of the tube, so that neither the wire nor the prefabricated insert project beyond the outer periphery of the tube and interfere with the steel tape 16 when it is folded about the tube, as will subsequently be described. While the dimensions of the prefabricated insert 33 and the bead 32 are not considered critical, favorable results have been achieved with an insert formed from a steel strip one-half inch wide and six-thousandths of an inch in thickness, with a bead having a height of one-sixteenth of an inch.

The steel tape folding apparatus 21, with the exception of the modified forming tube 31, may be of any suitable type, and in the illustrated embodiment of the invention includes a plurality of forming stations 37, one of which is shown in detail in FIG. 2, and a pair of horizontally spaced continuous forming belts 38 which pass through each forming station and about suitable sheaves 39 at entrance and exit ends of the steel tape folding apparatus.

As the steel tape 16 is pulled from a supply roll 41 by the advancing jacketed cable core 12, 13, the tape is formed by the belts 38 from a flat sheet configuration into an arcuate shape, and ultimately into a substantially cylindrical configuration about the forming tube 31 adjacent its exit end. Subsequently, the steel tape 16 passes through final forming rollers (not shown), after which a forming die 42 of the steel tape folding apparatus 21 squeezes the steel tape radially inward about the jacketed cable core 12, 13 and the aluminum tape 14, and overlaps the edge portions 16a of the steel tape, whereby as the jacketed cable core and the aluminum tape exit from the folding apparatus as they are enveloped by the steel tape.

As is best shown in FIG. 2, at each forming station 37 the forming tube 31 extends through an upstanding vertical frame plate 43 and each forming belt 38 rides over a sheave 44 rotatably mounted adjacent one end of an elongated rod member 46 which extends radially with respect to the forming tube. Each of the rod members 46 is adjustable longitudinally relative to, and also is movable with, a right-angle member 47, the two members being slidably mounted between suitable guideways fixed to the frame plate 43. Adjustment of the rod member 46 relative to the right-angle member 47 is accomplished by an adjusting screw 48 threaded through a projecting leg at one end of the right-angle member and suitably connected to the rod member so as to be rotatable relative thereto, as for example by a yoke member 46a engaged in a circumferential groove in the screw and secured to the rod member. Adjacent the other end of the right-angle member 47 a stud 47a projects laterally therefrom into a camming slot in a rotatable, ring-shaped cam plate 49 mounted in spaced relationship with respect to the frame plate 43. As is well known to those skilled in the art, at successive ones of the forming stations 37 as shown in FIG. 2, the positions of the belt supporting sheaves 44 progressively change in upward and inward directions with respect to the forming tube 31, to accomplish folding of the steel tape 16, as above described. The belts 38 return from the sheaves 39 at the exit end of the steel tape folding apparatus 21, to the sheaves 39 at the entrance end of the apparatus, over the sheaves 44' suitably mounted on the frame plates 43.

The steel tape 16 is supported at each of the forming stations 37 by the belts 38 and a roller 51 journalled on a vertically extending rod member 52. The rod member 52, as in the case of the rod members 46, is slidable with a right-angle member 47 having a projecting stud 47a thereon engaged in a camming slot in the rotatable cam plate 49, and is adjustable relative to the member 47 by means of an adjusting screw 48.

Adjacent the left-hand or entrance end of the steel tape folding apparatus 21, as viewed in FIG. 1, the forming tube 31 is resiliently mounted on a frame member of the folding apparatus by means of a flexible hanger assembly 53, while at the forming stations 37 adjacent the right-hand or exit end of the folding apparatus, the forming tube is supported by the steel tape 16 as shown in FIG. 2. The forming tube 31 is held down at each of the forming stations 37 by a roller 54 (FIG. 2) on the lower end of a vertical rod member 56 slidably and adjustably mounted for vertical movement in the same manner as the rod members 46 and 52.

The rotatable, ring-shaped cam plate 49 at each of the forming stations 37 encircles the forming tube 31, the forming belts 38, and the steel tape 16, as is best shown in FIG. 2, and is supported for rotation on a plurality of rollers 57 mounted on the station's vertical frame plate 43 in spaced relationship with respect to the frame plate. The cam plate 49 has an arcuate gear rack 58 secured thereto adjacent its bottom, and the gear rack is engaged with a gear member 59 on a horizontally disposed shaft 61. The shaft 61, which extends substantially the entire length of the steel tape folding apparatus 21 and which is journalled for rotation in the vertical frame plates 43, is rotatable by an adjusting crank 62 in a suitable manner, as for example by the gear 59 at one of the forming stations 37 being meshed with a worm screw 63 on the crank, as shown in FIG. 2. Thus, by rotation of the crank 62 the cam plates 43 at the forming stations 37 can be rotated in unison, whereby the sheaves 44 and the rollers 51 and 54, through the camming slots in the cam plates and the studs 47a, can be moved radially outward and inward for positioning of the steel tape 16 in the apparatus at the beginning of a cable run.

After the forming die 42 (FIG. 1) has shaped the steel tape 16 and overlapped its edge portions 16a as above described, the jacketed cable core 12, 13 and the two folded tapes 14 and 16 pass through the soldering station (not shown), in which the overlapped edge portions of the steel tape are soldered to form the continuous seam 17. Subsequently, the soldered cable assembly 12, 13, 14, 16 passes through an open seam detector (not shown), and is wound on the takeup mechanism 19, after which it is subjected to a jacketing operation in which the outer jacket 18 is applied thereto.

OPERATION

In preparing for a cable run, an aluminum tape folding tool 20 and a forming tube 31 of the proper sizes, depending on the diameter of the jacketed cable core 12, 13 being processed, are mounted in the apparatus and are preset vertically so that the jacketed cable core and the folded aluminum tape 14 will be advanced through the forming tube adjacent its bottom in engagement with the tape orienting and guiding bead 32, with the bead exerting radially inward pressure on the jacketed cable core. In the case of the aluminum tape folding tool 20, which supports the jacketed cable core 12, 13 and the folded aluminum tape 14 adjacent the entrance end of the forming tube 31, this is accomplished by means of the vertical adjustment bolt and slot connections 27 (FIG. 1). Similarly, the level of the forming tube 31 relative to the jacketed cable core 12, 13 and the folded aluminum tape 14 is set by moving the rod members 46, 52 and 56 (FIG. 2), and thus the sheaves 44 and the rollers 51 and 54, relative to the right-angle members 47 by means of the adjusting screws 48. The adjusting mechanism 58, 59, 61, 62, 63 then is operated by means of the crank 62 thereof to rotate the cam plates 49 at the forming stations 37 in unison so that the studs 47a and their respective camming slots in the cam plates cause radially outward movement of the sheaves 44 and the rollers 51 and 54, whereby the steel tape 16 can be inserted in the steel tape folding apparatus 21. The sheaves 44 and the rollers 51 and 54 then are moved radially inward to their operating positions by rotation of the crank 62.

During the cable run, the jacketed cable core 12, 13 is advanced from left to right, as viewed in FIG. 1, from the above-mentioned supply reel 29 to the aluminum tape folding tool 20. Initially, as the jacketed cable core 12, 13 passes through the folding tool 20, the core rides in the semicircular support member 22 and is guided thereby in proper alignment with the tape folding member 23. At the same time the advancing jacketed cable core 12, 13 pulls the aluminum tape 14 from the supply roll 29 in the form of a flat sheet and then through the tape folding member 23, which gradually folds the tape into a circular configuration about the jacketed cable core so that the edges 14a of the tape are in closely adjacent opposed relationship substantially beneath the jacketed cable core. Then, as the jacketed cable core 12, 13 and the folded aluminum tape 14 exit from the aluminum tape folding tool 20 to the forming tube 31 of the steel tape folding apparatus 21, the jacketed cable core is substantially enveloped by the aluminum tape.

If the jacketed cable core 12, 13 and the folded aluminum tape 14 enter the forming tube 31 with the tape rotated such that the gap between its edges 14a is not at the bottom of the jacketed cable core, as illustrated in FIG. 5, the exertion of pressure on the tape by the bead 32 causes the tape to rotate about the jacketed cable core as it and the tape are being advanced, until the opposed edges of the tape are on opposite sides of the bead, as shown in FIG. 6. Thereafter, as long as the jacketed cable core 12, 13 remains in engagement with the bead 32, the bead acts as a guide to retain the edges 14a of the tape 14 in their proper positions beneath the jacketed cable core.

The jacketed cable core 12, 13 and the folded aluminum tape 14, having once been brought into engagement with the bead 32 as shown in FIG. 6, normally will remain so engaged as a result of the weight of the jacketed cable core. However, if for some reason the jacketed cable core 12, 13 and the oriented tape 14 lift out of engagement with the bead 32 and the tape rotates out of its oriented position, upon return of the jacketed cable core and the tape to the bottom of the forming tube 31 so that the tape again is in pressure engagement with the bead, the bead will automatically restore the tape to its oriented position.

As the steel tape 16 is pulled from the supply roll 41 by the advancing jacketed cable core 12, 13, the tape is formed by the belts 38 from a flat sheet configuration into an arcuate shape, and ultimately into a substantially cylindrical configuration about the forming tube 31 adjacent its exit end. As the jacketed cable core 12, 13 and the two folded tapes 14 and 16 leave the last belt forming station 37, they pass through the above-mentioned final forming rollers (not shown), and then through the forming die 42 which squeezes the steel tape 16 radially inward about the jacketed cable core 12, 13 and the aluminum tape 14, and overlaps the edge portions 16a of the steel tape, whereby as the jacketed cable core and the aluminum tape exit from the steep tape folding apparatus 21 they are enveloped by the steel tape. The jacketed cable core 12, 13 and the two tapes 14 and 16 then pass through the above-mentioned soldering station (not shown), in which the overlapped edge portions 16a of the steel tape are soldered to form the continuous seam 17. Subsequently, the soldered cable assembly 12, 13, 14, 16 passes through the above-mentioned open seam detector (not shown) and is wound on the takeup mechanism 19, after which the assembly is subjected to an extruding operation in which the outer jacket 18 (FIG. 7) is applied thereto.

While one embodiment of the invention has been disclosed, many modifications will be apparent and it is intended that the invention be interpreted as including all modifications which fall within the true spirit and scope of the invention.

What is claimed is:

1. Apparatus for guiding an elongated tape, which has been folded about a longitudinally advancing strand so that the tape extends longitudinally of the strand with edges of the tape in opposed relationship, which apparatus comprises:

an elongated tube;

means for advancing the strand and the elongated folded tape longitudinally through said elongated tube;

a longitudinally extending, internal bead in said elongated tube projecting radially inward with respect to said tube so that opposite sides of said bead define preselected positions of the opposed edges of the folded tape; and means for supporting the strand and the folded tape relative to said elongated tube and said bead such that as the strand and the tape are advanced through said tube by said advancing means the opposite sides of said bead engage the opposed edges of the tape to prevent rotation of the edges out of their preselected positions.

2. Apparatus for orienting an elongated tape about a longitudinally advancing strand, wherein the tape has been folded about the strand so that the tape extends longitudinally of the strand with edges of the tape in opposed relationship, which apparatus comprises:
- an elongated tube;
- means for advancing the strand and the elongated folded tape longitudinally through said elongated tube;
- an internal bead in said elongated tube projecting radially inward with respect to said tube to define preselected positions of the opposed edges of the folded tape; and
- means for supporting the strand and the folded tape relative to said elongated tube such that said bead exerts pressure on the strand in a radially inward direction as the strand and the folded tape are advanced through said tube by said advancing means, said bead engaging the tape and exerting pressure thereon when the tape enters said tube with its opposed edges displaced from their preselected positions, so as to cause rotation of the tape about the strand until the opposed edges of the tape are in their preselected positions adjacent opposite sides of said bead, after which said bead engages the opposed edges of the tape to prevent further rotation of the tape about the strand.

3. Apparatus for orienting an elongated tape about a longitudinally advancing strand, wherein the tape has been folded about the strand so that the tape extends longitudinally of the strand with edges of the tape in opposed relationship, as recited in claim 2, in which said bead and surface portions in said elongated tube adjacent the opposite sides of said bead are relatively smooth so as not to damage the strand and the folded tape as the strand and the tape are advanced through said tube by said advancing means.

4. Apparatus for wrapping an elongated tape about a longitudinally advancing strand, wherein the tape has been folded about the strand so that the tape extends longitudinally of the strand with edges of the tape in opposed relationship, as recited in claim 3, in which said bead and said surface portions form parts of an elongated prefabricated insert mounted in said elongated tube.

5. Apparatus for folding first and second elongated tapes about a longitudinally advancing strand, which comprisse:
- first folding means for folding the first elongated tape about the longitudinally advancing strand so that the tape extends longitudinally of the strand with the edges of the tape in opposed relationship;
- an elongated tube;
- single means for advancing the strand and the first elongated tape longitudinally through said first folding means and said elongated tube in sequence, and for advancing the second elongated tape;
- a longitudinally extending, internal bead in said elongated tube projecting radially inward with respect to said tube to define preselected positions of the opposed edges of the first elongated tape, said bead and surface portions in said elongated tube adjacent opposite sides of said bead being relatively smooth so as not to damage the strand and the first tape as the strand and the tape are advanced through said tube by said advancing means;
- second folding means for folding the second elongated tape about said elongated tube adjacent an exit end of said tube as the strand and the first and second tapes are advanced by said advancing means, such that the second tape extends longitudinally of the strand with edges of the second tape in preselected positions relative to the preselected positions of the opposed edges of the first tape, and such that the strand and the first tape are enveloped by the second tape as the strand and the first tape exit from said tube, said first folding means supporting the strand and the folded first tape relative to said elongated tube, and said second folding means supporting said elongated tube relative to the strand and the folded first tape, such that said bead in said tube exerts pressure on the strand in a radially inward direction as the strand and the first tape are advanced through said tube by said advancing means, said bead engaging the first tape and exerting pressure thereon when the tape enters said tube with its opposed edges displaced from their preselected positions, so as to cause rotation of the tape about the strand until the opposed edges of the tape are in their preselected positions adjacent opposite sides of said bead, after which said bead engages the opposed edges of the tape to prevent further rotation of the tape about the strand.

6. Apparatus for folding first and second elongated tapes about a longitudinally advancing strand, as recited in claim 5, which further comprises:
- a prefabricated insert, of which said bead and said surface portions adjacent said bead form parts, mounted in said elongated tube; and
- means for securing said prefabricated insert to said elongated tube adjacent the exit end of said tube such that said securing means and said insert are contained entirely within the outer periphery of said tube and do not interfere with the second elongated tape as it is folded about said tube by said second folding means.

References Cited
UNITED STATES PATENTS

| | | | |
|---|---|---|---|
| 2,948,324 | 8/1960 | Penrose | 72—178 |
| 3,005,480 | 10/1961 | Slechta | 29—202.5 |
| 3,026,924 | 3/1962 | Lunt et al. | 29—202.5 |
| 3,069,763 | 12/1962 | Reynolds | 29—429 |

THOMAS H. EAGER, *Primary Examiner.*